(12) United States Patent
Walker et al.

(10) Patent No.: US 10,521,385 B2
(45) Date of Patent: *Dec. 31, 2019

(54) INTER-DEVICE DIGITAL AUDIO (71) Applicant: Apple Inc., Cupertino, CA (US)

(72) Inventors: Torrey H. Walker, Campbell, CA (US); Daniel C. Klingler, Moutain View, CA (US); Balasubramanya Bhat, Milpitas, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/045,591

(22) Filed: Jul. 25, 2018

(65) Prior Publication Data
US 2018/0329846 A1 Nov. 15, 2018

Related U.S. Application Data

(63) Continuation of application No. 14/994,049, filed on Jan. 12, 2016, now Pat. No. 10,042,802.

(60) Provisional application No. 62/171,738, filed on Jun. 5, 2015.

(51) Int. Cl.
| | |
|---|---|
| *G06F 11/14* | (2006.01) |
| *G06F 13/38* | (2006.01) |
| *G06F 13/42* | (2006.01) |
| *G06F 9/54* | (2006.01) |
| *G06F 11/30* | (2006.01) |

(52) U.S. Cl.
CPC .............. *G06F 13/385* (2013.01); *G06F 9/54* (2013.01); *G06F 11/3027* (2013.01); *G06F 11/3051* (2013.01); *G06F 13/4282* (2013.01)

(58) Field of Classification Search
CPC ............................ G06F 11/1433; G06F 3/123
See application file for complete search history.

(56) References Cited

U.S. PATENT DOCUMENTS

| | | | |
|---|---|---|---|
| 8,412,268 B2 * | 4/2013 | Inha ................... | H04M 1/6058 348/14.01 |
| 8,412,857 B2 | 4/2013 | Ady et al. | |
| 2007/0174092 A1 * | 7/2007 | Lara ................... | G06F 19/3456 705/3 |
| 2007/0186036 A1 * | 8/2007 | Bittner, Jr. ............. | G11C 15/00 711/108 |
| 2008/0270590 A1 * | 10/2008 | Ng ........................ | G06F 9/5016 709/223 |

(Continued)

*Primary Examiner* — Hyun Nam
(74) *Attorney, Agent, or Firm* — Womble Bond Dickinson (US) LLP (57) ABSTRACT

A method for reconfiguring a bus device from a first configuration into a second configuration, wherein the second configuration is not visible to, and is not selectable by, an unauthorized host device that connects to the bus device through a peripheral port of the bus device is described. In the bus device, a received message transmitted by the authorized host device through the peripheral port of the bus device to which the authorized host device is connected is parsed and an instruction to reconfigure the bus device from the first configuration into the second configuration is detected. Responsive to detecting the instruction, a daemon signals reconfiguration of the bus device into the second configuration, and responsive to the daemon signaling, the bus device is reconfigured into the second configuration. Other embodiments are also described.

20 Claims, 5 Drawing Sheets

(56) References Cited

U.S. PATENT DOCUMENTS

| | | | |
|---|---|---|---|
| 2010/0054857 A1* | 3/2010 | Ray | E02D 29/14 |
| | | | 404/25 |
| 2012/0297341 A1* | 11/2012 | Glazer | G06F 8/30 |
| | | | 715/810 |
| 2013/0080662 A1 | 3/2013 | Bourque | |
| 2014/0304430 A1 | 10/2014 | Salley et al. | |
| 2015/0271318 A1* | 9/2015 | Antos | H04M 1/72583 |
| | | | 455/412.1 |

* cited by examiner

INTER-DEVICE DIGITAL AUDIO

CROSS-REFERENCE TO RELATED APPLICATIONS

This patent application is a continuation application of U.S. non-provisional application Ser. No. 14/994,049, filed Jan. 12, 2016, which claims the benefit of the earlier priority date of U.S. provisional application 62/171,738 filed on Jun. 5, 2015.

FIELD

Embodiments of the disclosure here relate to a digital audio link between a bus device and a host device. More specifically, one embodiment of the disclosure relates to reconfiguring a bus device into a configuration that is only viewable and selectable by authorized host devices and that enables the bus device to transmit digital musical instrument audio data to an authorized host device using a single, physical connection. Other embodiments are also described.

BACKGROUND

In recent years, there has been a substantial increase in the use of portable bus devices, such as smart phones and tablet computers, for audio generation and processing. A user may desire to provide the generated or processed audio data to a host device, such as a laptop computer or a desktop computer, that includes a more powerful processor, a larger amount of memory, or a larger battery than the bus device. When physically connecting a bus device to a host device, it is inconvenient to do so with multiple cables and one or more adapters.

Currently, a bus device (e.g., a tablet, mobile phone or music player) that is compliant with one or more versions of the Universal Serial Bus (USB) specification may require multiple cables and one or more electronic signal adapters to transmit digital audio data to the host device that is also compliant with one or more versions of the USB specification (e.g., a laptop computer or a desktop computer).

Some car radio head units acting as the host device, require that bus devices include only a predetermined and limited set of configurations or capabilities in order to function properly. Therefore, if a configuration is altered, added to, or removed from a bus device, some legacy systems (e.g., host devices) may not function properly while interacting with the bus device.

Additionally, some bus devices are part of a technology ecosystem in which only interactions between devices authorized by the ecosystem may utilize the full functionality of both of the devices (bus and host).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

In one embodiment, an authorized host device is enabled to provide a message to a bus device (via a computer peripheral bus port) instructing the bus device to switch from a first, default configuration to a second configuration where the second configuration is not visible to, or selectable by, an unauthorized host device. The bus device may connect to the host device through a bus having a physical medium (e.g., a physical cable that joins their respective bus ports, such as a USB cable). For example, there may be a first set of configurations that are visible to, and selectable by, all external devices that connect to the bus device, and a second set of configurations that are only visible to, and selectable by, authorized host devices.

Once the physical connection of the bus has been made, the host device transmits a message to the bus device over the physical connection. When the bus device determines or recognizes that the host device is an authorized host device, the bus device launches a daemon to parse the message. In one embodiment, the host device may be an authorized device only if it is running a specific version of an operating system. Alternatively, a host device may be determined to be an authorized host device after the completion of a successful Secure Sockets Layer (SSL)/Transport Layer Security (TSL) negotiation ("SSL/TSL negotiation").

Upon detecting a request in the message, the daemon queries a controller of the bus device via a specialized application programming interface (API) to detect (i) the current configuration of the bus device and (ii) the available configurations of the bus device. In one embodiment, the daemon may only be launched as a result of a message received from an authorized host device, and the specialized API used to query the controller for configuration information may be accessible by the daemon but not by a host device. Upon detecting the current configuration and the available configurations, the daemon causes the bus device to transmit a message to the host device (over the same and existing physical connection) that includes configuration information (e.g., the current configuration and the available configurations of the bus device).

When the host device discovers (from reciprocal configuration information) that the bus device is not currently in a predetermined, specialized configuration, the host device may prompt a user of the host device to indicate whether the user would like to utilize the bus device in the specialized configuration. When the user selects to use the bus device in the specialized configuration, the host device transmits a second message to the bus device (over the physical connection) instructing the bus device to reconfigure into the specialized configuration.

Upon receiving the second message, the daemon of the bus device parses the message. In response to the instruction from the authorized host device, the daemon instructs the controller of the bus device (via the API) to reconfigure the bus device into the specialized configuration. During reconfiguration, the controller of the bus device causes the bus device to logically disconnect from the bus. Upon re-enumeration of the bus by the host device, the bus device appears on the bus in the specialized configuration. In one embodiment, when in the specialized configuration, the bus device may transmit isochronous audio data to the host device over the physical medium directly, i.e., without the need for an adapter that conditions, converts or translates the carrier data signal.

In one embodiment, it would be advantageous if the mobile bus device included a configuration that enabled transfer of isochronous audio data directly over a single cable and did not interfere with the operation of legacy systems. In yet another embodiment, it would be advantageous to users if a mobile bus device included a configuration that enabled transfer of isochronous audio data directly over a single cable and did not interfere with the operation of legacy systems, as such discussed above, and that was also only viewable, and selectable, by authorized host devices.

Additionally, in some embodiments, while configured in the specialized configuration, the bus device transfers audio data in the musical instrument digital interface (MIDI) format as an alternative to isochronous audio data. In yet another embodiment, the bus device, configured in the specialized configuration, transfers both isochronous audio data and audio data in the MIDI format from a first set of USB hardware (e.g., a bus device) directly to a second set of USB hardware (e.g., the host device) through a single physical connection.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, for conciseness, a given figure may be used to illustrate the features of more than one embodiment of the invention, and not all elements in a figure may be required for a given embodiment.

DETAILED DESCRIPTION

Various embodiments of the disclosure relate to the reconfiguration of a bus device as a result of a physical connection to an authorized host device. Specifically, upon receiving an instruction from an authorized host device, the bus device is reconfigured into a specialized configuration. This configuration is only viewable and selectable by an authorized host device, and not by unauthorized host devices (that otherwise can connect through the physical connection). In one embodiment, the specialized configuration enables higher level application programs (e.g., musical instrument applications) running on the bus device to transmit isochronous audio data directly to the authorized host device over a single cable, i.e., without any adapter circuits. In some embodiments, when in the specialized configuration, the bus device is a device that can transfer data using a cable that is compliant with a version of the USB specification ("a USB compliant device").

Herein, the term "host device" generally refers to an electronic device that initiates communication with a bus device when a physical communication connection is made between the host device and the bus device (through a physical medium). Illustrative examples of a host device include, among others, a laptop, netbook and desktop computer.

Herein, the term "bus device" may refer to an electronic device that responds to communication initiated by a host device over a physical medium (through a bus port of the bus device). Illustrative examples of a bus device include, among others, a laptop, a netbook and a mobile device such as a smartphone, a personal digital assistant (PDA), or a tablet computer.

The term "connection" is a physical or logical communication path between two or more network devices. An example of a physical connection may include a physical cable that supports the transfer of messages between a first connector (e.g., a first endpoint of the cable) and a second connector (e.g., a second endpoint of the cable). An example of a logical connection may include a software application of a first electronic device recognizing that a physical connection with a second electronic device has been made.

The term "configuration" generally refers to a software implementation, which may include defining one or more particular drivers to control one or more operations such as controlling the input and output of digital audio data.

The term "message" generally refers to information transmitted in a prescribed format, where each message may be in the form of a packet, a frame, or any other series of bits having the prescribed format. Examples include those defined in one or more versions of the USB specification.

Lastly, the terms "or" and "and/or" as used herein are to be interpreted as an inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

Figure 1:
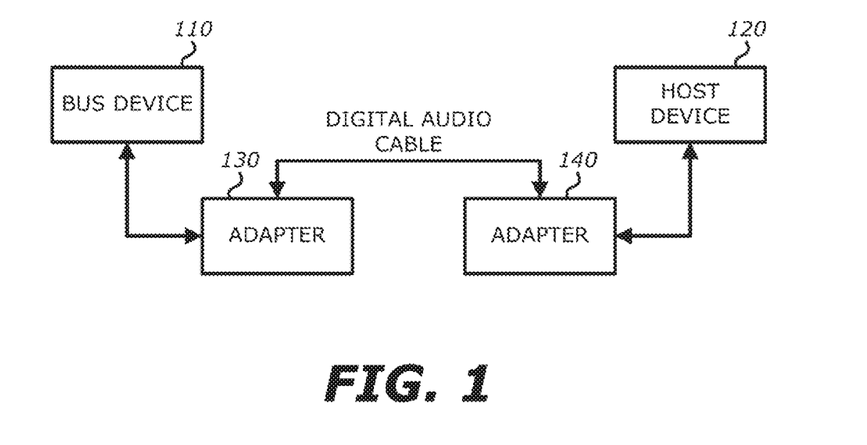
FIG. 1 is a block diagram of an exemplary communication path illustrating a flow of isochronous audio data from a bus device to a host device.

Referring to FIG. 1, a block diagram of an exemplary communication path illustrating a flow of isochronous audio data from a bus device to a host device is shown. As illustrated in FIG. 1, a bus device 110 is communicatively coupled to a host device 120. The communicative coupling spans a plurality of cables and the adapter devices 130 and 140. A first physical cable is plugged into a computer peripheral bus port of the bus device 110 and into the adapter device 130. A second cable, illustrated as a digital audio cable, is plugged into the adapter device 130 and into another adapter device 140. Examples of a digital audio cable may include, but are not limited or restricted to, a Sony/Philips Digital Interface Format (S/P DIF) cable or a coaxial cable. To complete the communicative coupling, a third cable is plugged into the adapter device 140 and into a computer peripheral bus port of the host device 120.

Through this communicative coupling, the host device 120 may receive audio data from the bus device 110. In one embodiment, the adapter device 130 and/or the adapter device 140 may convert the signaling and/or encoding format of the audio output of the bus device 110 to a digital audio output that may be received by the host device 120 as audio data. Herein, when digital audio is transferred from USB audio hardware (e.g., the bus device 110) to USB audio hardware (e.g., the host device 120) using a digital audio cable (e.g., the S/P DIF cable), the audio data is not considered isochronous.

Figure 2:
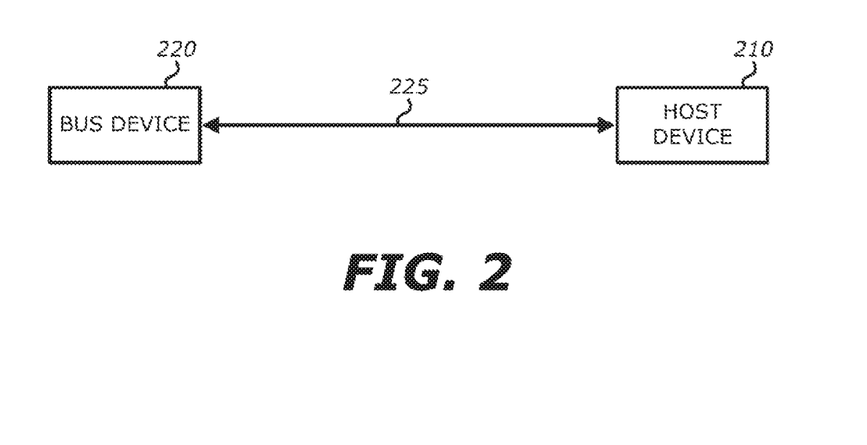
FIG. 2 is a block diagram of an exemplary communication path illustrating a flow of isochronous audio data from a bus device to an authorized host device.

Referring to FIG. 2, a block diagram of an exemplary communication path illustrating a flow of isochronous audio data from a bus device to an authorized host device is shown. In the embodiment shown, the host device 210 is directly connected via a physical medium to the bus device 220. The physical medium may represent a single, physical cable. The single, physical cable may include two of the same connectors at its ends, or a first connector and a second connector, the second connector being different than the first connector. Examples of the single, physical cable include, but are not limited or restricted to, (i) a USB A/B cable, which includes a first connector being USB type A and a second connector being USB Type B, (ii) a USB A/A cable, which includes first and second connectors being USB Type A, (iii) a cable including a first connector being USB Type A and a second connector being micro-USB Type B and/or (iv) a cable including a first connector being USB 2.0 Type A and a second connector having a proprietary design. Herein, the use of the term, "USB," may refer to one or more versions of the USB specification, including, but not limited or restricted to, USB 1.0, USB 2.0, USB 3.0, USB 3.1 and/or USB type-c.

In this embodiment, the host device 210 and the bus device 220 are joined by a direct physical connection (e.g., a communication path) across the cable 225, without any intermediary adapter devices (e.g., see FIG. 1). The host device 210 may transmit a first message to the bus device 220 to inquire about the current configuration of the bus device 220. Upon receiving a response from the bus device 220 that the bus device 220 is currently in a first configuration, the host device 210 may transmit a second message instructing the bus device 220 to reconfigure itself into a second configuration.

In one embodiment, the host device 210 is an authorized host device and the second configuration is a configuration that is viewable and selectable only by an authorized host device. For example, assuming the second configuration is viewable and selectable only by an authorized host device, an unauthorized host device would not be presented with the second configuration (by the bus device 220) as a possible configuration of the bus device 220 (e.g., the special configuration is not viewable). Furthermore, the unauthorized host is not even able to instruct the bus device 220 to reconfigure into the second configuration even if the unauthorized host is not presented with the second configuration but "knows" of its existence (e.g., the special configuration is not selectable).

A host device may be deemed to be authorized by a bus device in one or more ways. In one embodiment, the bus device may determine that a host device is authorized, through a successful SSL/TSL negotiation between them. Alternatively, or additionally, the bus device may determine the host device is authorized by recognizing that a key transmitted by the host device appears in a look-up table maintained on the bus device (e.g., a key may represent the version of the operating system running on the host device, such that the host device is deemed to be authorized because it is running one of a predetermined version of an operating system).

In one embodiment, when in the second (special) configuration, the bus device can transmit messages in one or more particularized formats that are not possible when the bus device is in the first configuration. In one embodiment, when in the second configuration, the bus device can transfer data using a cable that is compliant with a version of the USB specification (e.g., version 2.0). Additionally, when in the second configuration, the bus device may transfer isochronous audio data directly to the host device across a single, physical cable, without any intermediary adapter devices.

In contrast to the embodiment of FIG. 1 which does not transfer isochronous audio data due to the digital audio cable (e.g., the S/P DIF cable) connecting the bus device 110 and the host device 120, FIG. 2 illustrates one embodiment of the invention in which isochronous audio data is transfer directly from the bus device 220 to the host device 210 over a single, physical cable (e.g., a USB specification 2.0 compliant cable).

Figure 3:
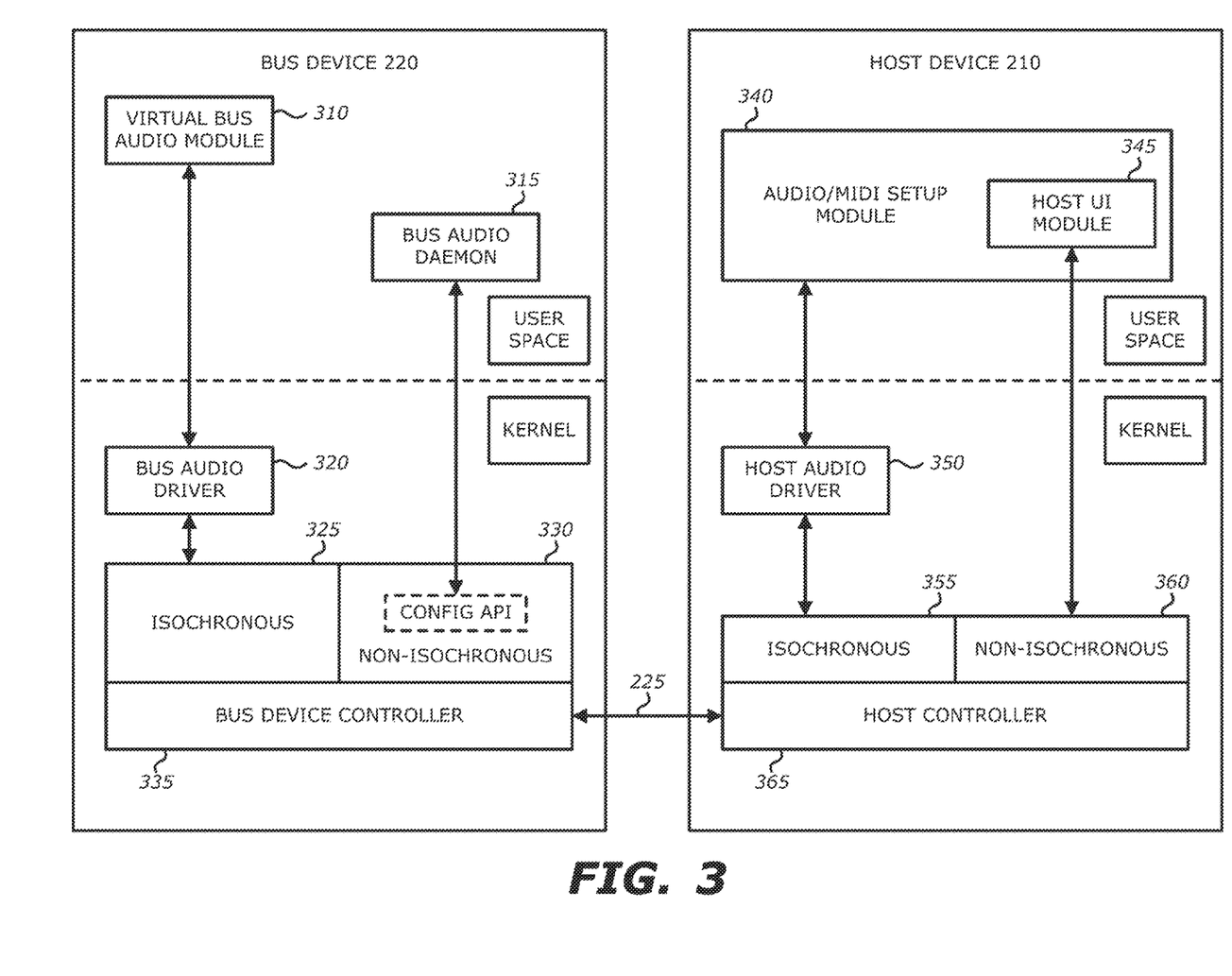
FIG. 3 is a block diagram of an exemplary bus device and an exemplary authorized host device according to the illustration of FIG. 2.

Referring to FIG. 3, a block diagram of an exemplary bus device and an exemplary authorized host device according to the illustration of FIG. 2 is shown. The block diagram illustrates a bus device 220 directly connected to a host device 210 via a cable 225. The bus device 220 includes a virtual bus audio module 310, a bus audio daemon 315, a bus audio driver 320 and a bus device controller 335 that includes an isochronous API 325 and a non-isochronous API 330, which includes a configuration application programming interface (API). The virtual bus audio module 310 and the bus audio daemon 315 are located in user space of the bus device 220 while the bus audio driver 320 and the bus device controller 335 are located in the kernel of the bus device 220.

The virtual bus audio module 310 serves as an abstraction of a current application of the bus device 220 and is communicatively coupled to the bus audio driver 320. For example, the virtual bus audio module 310 may receive all instructions to generate audio signals, which instructions may be produced by a higher layer, audio generation application of the bus device 220 (not shown), and provide the audio signals to the bus audio driver 320. In one embodiment, the bus audio driver 320 may provide the audio signals to the bus device controller 335 for transmission to the host device 210 via the cable 225. The bus device controller 335 may receive messages from the host device 210 via the cable 225 and provide one or more of the messages to the bus audio daemon 315, which may parse the messages.

The host device 210 includes an audio/MIDI setup module 340 that includes a host user interface (UI) module 345, a host audio driver 350 and a host controller 365 that includes an isochronous API 355 and a non-isochronous API 360. The host controller 365 controls communication to and from the host device 210 while the bus device controller 335 controls communication to and from the bus device 220. The audio/MIDI setup module 340 is located in user space of the host device 210 while the host audio driver 350 and the host controller 365 are located in the kernel of the host device 210.

The host controller 365 may determine a physical connection has been made with the bus device 220 in response to the cable 225 being plugged into a computer peripheral bus port of the host device 210 and into a counterpart bus port of the bus device 220. In one example, the computer peripheral bus ports of the bus device 220 and the host device 210 into which the cable 225 plugs are USB ports.

In one embodiment, upon detecting a physical connection, the host controller 365 may generate a first message requesting information from the bus device 220, such as its configuration information, and transmit the first message to the bus device 220 via the cable 225. The host controller 365 may also receive audio data the bus device 220 via the cable 225 and provide the audio data to the host audio driver 350, which in turn provides the audio data to the audio/MIDI setup module 340. The audio/MIDI setup module 340 may then provide the audio data to one or more applications of the host device 210.

The host UI module 345 may generate notifications and present the notifications to a user of the host device 210. In one embodiment, the host controller 365 may provide the host UI module 345 with configuration information of the bus device 220. In response, the UI module 345 may generate, and present, a user interface through which a user of the host device 210 may be prompted or asked whether a change in the configuration of the bus device 220 is desired.

Additionally, in one embodiment, the host device 210 may supply a charging current to the bus device 220 over the cable 225 that changes a primary power source (e.g., battery) of the bus device 220, while the host device 210 and the bus device 220 exchange messages and/or transports data streams. For example, the bus device 220 may receive a charging current from the host device 210 over the cable 225 while transferring an isochronous audio data stream to the host device 210 over the cable 225.

Figure 4A:
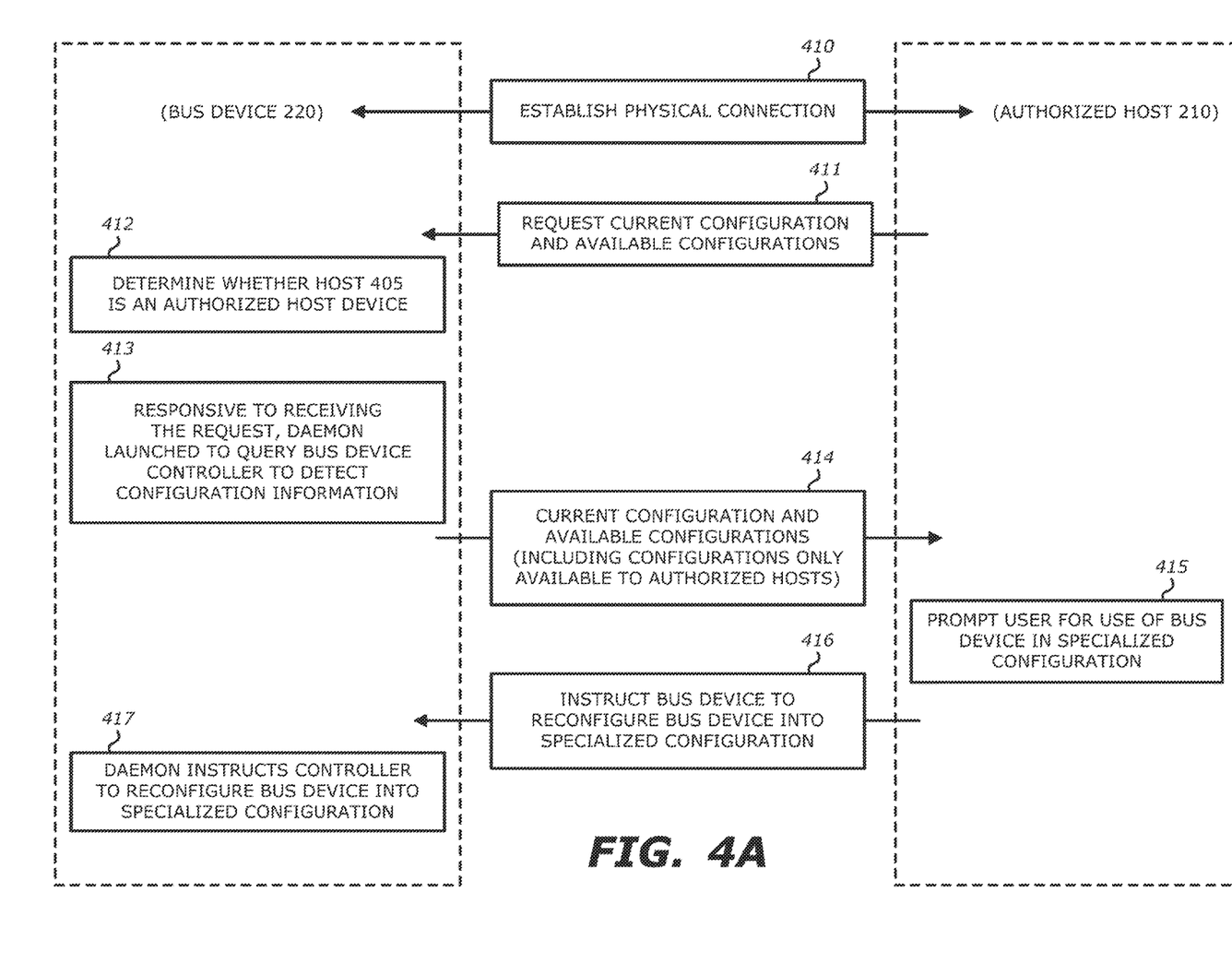
FIG. 4A is a block diagram illustrating a first portion of an exemplary exchange of communications between a bus device and an authorized host device.
Figure 4B:
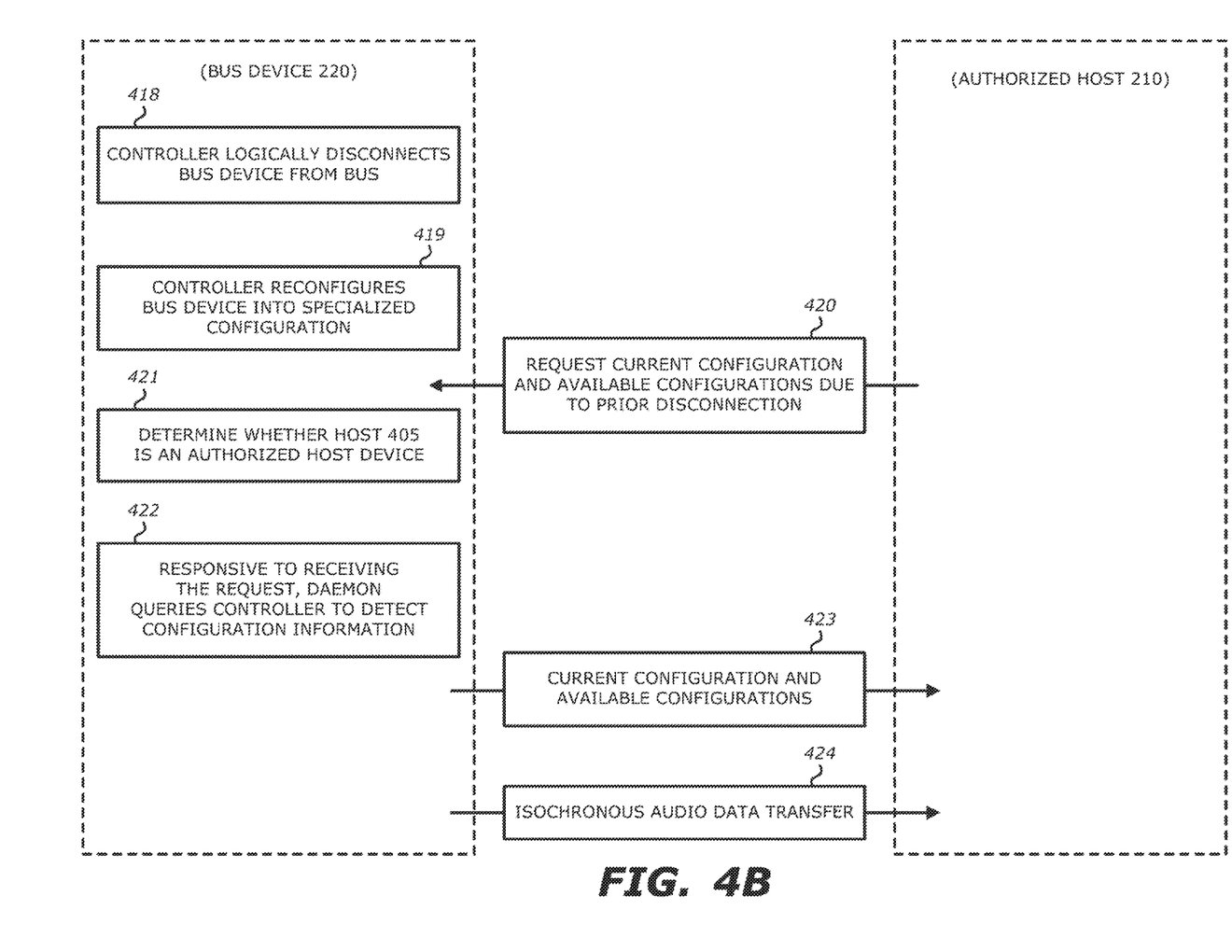
FIG. 4B is a block diagram illustrating a second portion of an exemplary exchange of communications between the bus device and the authorized host device of FIG. 4A.

Referring to FIGS. 4A and 4B, a block diagram illustrating an exemplary exchange of communications between a bus device and an authorized host device is shown. Specifically, referring to FIG. 4A, a block diagram illustrating a first portion of an exemplary exchange of communications between a bus device and an authorized host device is shown. Communication block 410 illustrates that a physical layer-based connection is established between the bus device 220 a host device 210. In one embodiment, the physical layer-based connection may be based on a physical cable with two connectors (e.g., FIG. 2), a first connector attached to the bus device 220 and a second connector attached to the host device 210. In some embodiments, the first connector differs from the second connector, but it is also contemplated that the first and second connectors could be identical. When the physical connection has been established, the host device 210 transmits a first message to the bus device 220 requesting the current configuration and available configurations of the bus device (hereinafter referred to as "configuration information") (communication block 411). This message transfer may occur while the host device 210 and the bus device 220 are both configured into the same (e.g., the first) configuration of a computer peripheral bus port communications mechanism, e.g., a non-isochronous USB device configuration) in accordance with any version of the USB specification.

Upon receiving the first message from the host device 210, the bus device 220 determines whether the host device 210 is an authorized host device (operation block 412). As discussed above, the bus device 220 and the host device 210 may participate in a SSL/TSL negotiation to determine whether the host device 210 is an authorized host device, or the first message may include identification and/or characteristic information that enables the bus device 220 to recognize whether the host device 210 is an authorized host device. Identification and/or characteristic information may include, inter alia, information regarding software versions running on the host device 210 such as an operating system version and/or a specific application version that is compared by the bus device to previously identified operating system versions or application versions (e.g., stored in a memory of the bus device).

Once the host device 210 has been determined to be an authorized host device (in response to receiving the first message), a specialized daemon (e.g., the bus audio daemon 315 of FIG. 3) is launched to parse the first message (operation block 413). The specialized daemon may be the only daemon that has access to utilize a specialized API for querying a controller 335 (see FIG. 3) regarding configuration information of the bus device 220 and instructing the controller to reconfigure the bus device 220 into a specialized configuration. The first message may comprise a serialized property list including information (e.g., flags or keys) that detail instructions regarding the configuration of the bus device 220. In one example, a first flag may be set to a particular value (e.g., '1' or "TRUE") which may be interpreted as a request for a specialized configuration.

Subsequently, the specialized daemon queries a controller of the bus device 220 to detect the configuration information of the bus device 220 (operation block 413). Specifically, the specialized daemon is only launched when a message requesting configuration information of the bus device 220 is received from an authorized host device. Therefore, if a message requesting configuration information of the bus device 220 is received from an unauthorized host device, the specialized daemon will determine the host device is unauthorized and not provide configuration pertaining to the specialized configuration. The specialized daemon has access to utilize a specialized API when querying the controller of the bus device to detect the current configuration and the available configurations. Herein, only requests using the specialized API may return all available configurations, publicly available (e.g., configurations viewable and selectable by any host device) and hidden (e.g., configurations viewable only by authorized host devices). Therefore, requests made by the specialized daemon to detect the available configurations of the bus device 220 return all publicly available configurations and all hidden configurations as a result of requests from an authorized host device. In contrast requests made by the specialized daemon to detect the available configurations of the bus device 220 as a result of requests by an unauthorized host device return only the publicly available configurations (e.g., the specialized configuration is only viewable by authorized host devices).

The specialized daemon may then generate a message (e.g., a serialized property list) detailing the configuration information of the bus device and the bus device may transmit the message to the host device 210 (communication block 414).

Upon parsing the message transmitted by the bus device 220 and determining the bus device 220 is not configured in the specialized configuration, the host device 210 may prompt the user of the host device 210 to determine whether the bus device 220 should be reconfigured into the specialized configuration (operation block 415). Upon a selection by the user of the host device 210 to use the bus device 220 in the specialized configuration, the host device 210 transmits a second message to the bus device 220 with an instruction to reconfigure the bus device into the specialized configuration (communication block 416).

After the second message has been received by the bus device 220, the daemon parses the second message and detects the instruction to reconfigure the bus device 220. In response, the daemon uses the specialized API to instruct the controller to reconfigure the bus device into the specialized configuration (operation block 417). As discussed above, only the specialized API can be utilized to disclose all publicly available and hidden configurations to an authorized host device. Additionally, the specialized API must be used to instruct the controller to reconfigure the bus device 220 into the specialized API. As only the specialized daemon has access to utilize the specialized API and the specialized API must be used to instruct the controller to reconfigure the bus device 220 into the specialized configuration, only the specialized daemon can instruct the controller to reconfigure the bus device 220 into the specialized configuration. Therefore, as the specialized daemon is only launched in response to a message from an authorized host device, only an authorized host device can instruct the bus device 220 to reconfigure into the specialized configuration (e.g., the specialized configuration is only selectable by an authorized host device).

Referring now to FIG. 4B, a block diagram illustrating a second portion of the exemplary exchange of communications between the bus device 220 and the authorized host device 210 illustrated in FIG. 4A is shown. Upon receiving an instruction to reconfigure the bus device from the daemon using the specialized API, the controller logically disconnects the bus device from the bus (operation block 418) and reconfigures the bus device into the specialized configuration (operation block 419).

Following the completion of the reconfiguration of the bus device 220, the bus device 220 reappears on the bus as a bus device in the specialized configuration. In one embodiment, the bus device 220 configured in the specialized configuration may appear on the bus as a USB device compliant with, for example, the specification of USB version 2.0. In such an embodiment, the bus device 220 may not include a USB connector (e.g., USB Type A, USB Type B, USB type-c, micro USB and/or mini USB).

Upon detecting the bus device 220 has reappeared on the bus, the host device 210 may transmit a third message to the bus device 220 requesting the configuration information of the bus device 220 (communication block 420). The bus device 220 may make a determination as to whether the host device 210 is an authorized host device (operation block 421) and the daemon may query the controller to detect the new configuration information (operation block 422). Subsequently the bus device 220 may transmit a second message to the host device 210 that includes the configuration information of the bus device 220 (e.g., that the bus device 220 is in the specialized configuration). Finally, being in the specialized configuration, the bus device 220 may transmit isochronous audio data to the host device 210 directly over the physical cable (communication message 424).

Figure 5:
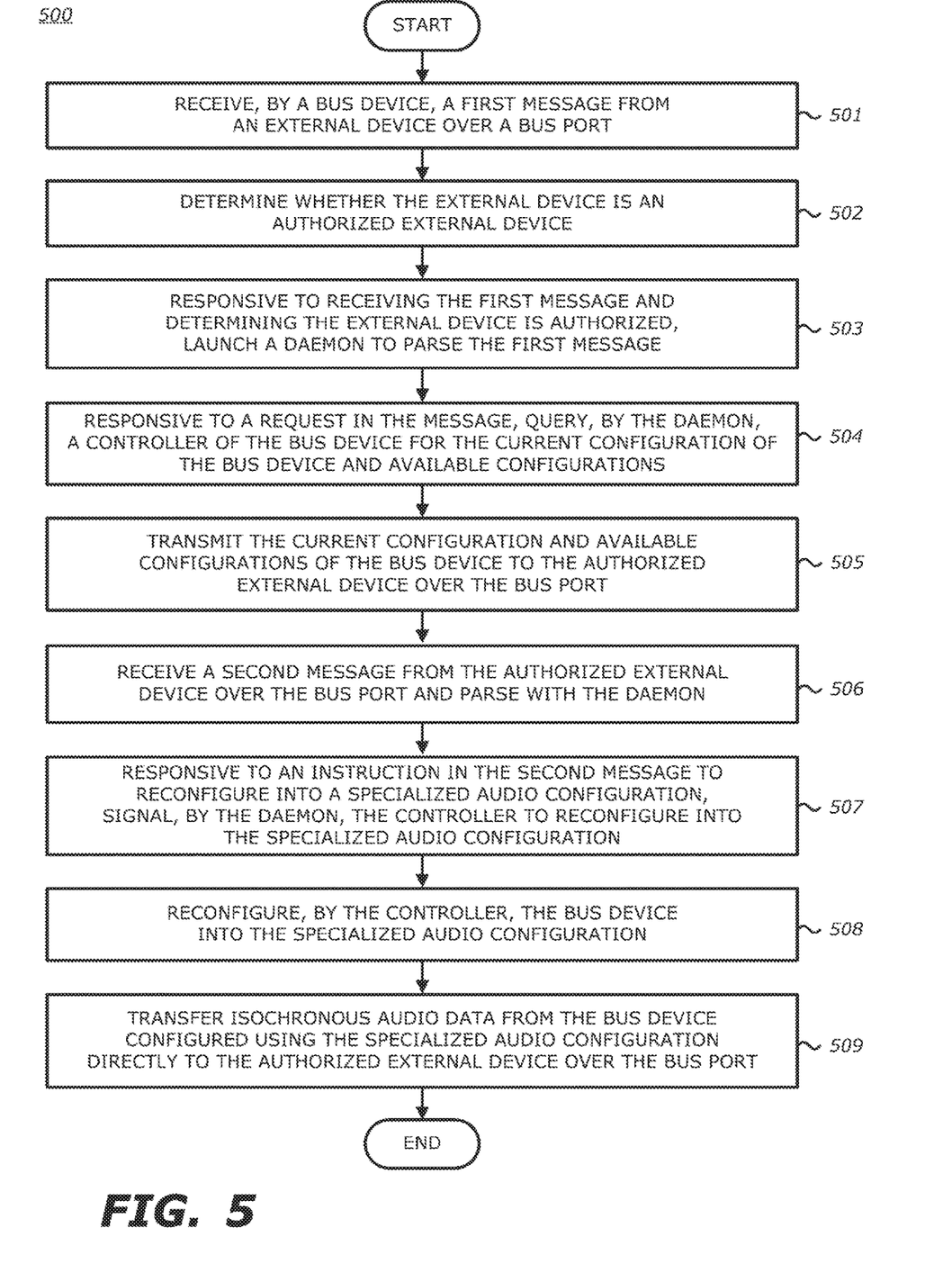
FIG. 5 is a flowchart of an exemplary method for reconfiguring a bus device into a hidden and locked configuration as a result of a physical connection being made with an authorized host device.

Referring to FIG. 5, a flowchart of an exemplary method for reconfiguring a bus device into a hidden and locked configuration as a result of a physical connection with an external device is shown. Each block illustrated in FIG. 5 represents an operation performed in the method 500 of reconfiguring a bus device. At block 501, a bus device receives a first message via a computer peripheral bus port. In one embodiment, the first message may be received from an external device that is connected through a physical medium to the bus device. At block 502, the bus device determines the external device is an authorized external device. In one example, the bus device and the external device may participate in a SSL/TSL handshake to determine whether the external device is authorized. However, if the external device determines the external device is not authorized, the method 500 ends.

At block 503, in response to receiving the first message and determining the external device is an authorized external device, the bus device launches a daemon to parse one or more portions of the first message. Upon detecting a request in the first message, the daemon queries a controller of the bus device to detect the current configuration of and the available configurations for the bus device (block 504). Subsequently, the bus device transmits a message including the current configuration of and the available configurations for the bus device (to the authorized external device over the computer peripheral bus port) (block 505).

At block 506, the bus device receives a second message (from the authorized external device) over the computer peripheral bus port and the daemon parses one or more portions of the second message. In response to detecting an instruction in the second message to reconfigure the bus device to a specialized audio configuration, the daemon signals the controller to reconfigure the bus device to the specialized audio configuration (block 507).

Subsequently, upon receiving the signal to reconfigure the bus device, the controller reconfigures the bus device into the specialized audio configuration (block 508). As part of the reconfiguration process, the controller logically disconnects the bus device from the bus (e.g., the physical cable) connecting the bus device and the authorized external device. When the reconfiguration is complete, the bus device transmits a message to the authorized external device causing the authorized external device to re-enumerate the port to which the bus device is connected. Next, when the authorized external device re-enumerates the port (to which the bus device is connected) and discovers the bus device, the bus device, this time, appears as configured in the specialized audio configuration. In one embodiment, when configured in the specialized audio configuration, the bus device can stream isochronous audio data directly to the authorized external device via a single physical cable connecting the bus device and authorized external device (block 509). This may include, referring now to FIG. 3, the virtual bus audio module 310 receiving an audio stream from a higher layer application program, e.g., a musical instrument application, providing the audio stream to the bus device controller 335 and the bus device controller 335 transmitting the audio stream to an external device over the bus without any intermediary adapter devices.

It is contemplated that both a host device and a bus device include hardware logic such as one or more of the following: (i) processing circuitry; (ii) one or more communication interfaces such as a radio (e.g., component that handles the wireless data transmission and/or reception) and/or a physical connector to support wired connectivity; and/or (iii) memory in the form of a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.); or any connector for receiving a portable memory device such as a Universal Serial Bus "USB" flash drive, portable hard disk drive, or the like.

Herein, the term "logic" is generally defined as hardware and/or software. For example, as hardware, logic may include processing circuitry (e.g., a microcontroller, any type of processor, a programmable gate array, an application specific integrated circuit, etc.), semiconductor memory, combinatorial logic, or the like. As software, logic may be one or more software modules that may be stored in any type of a suitable non-transitory storage medium (described above) or transitory computer-readable transmission media (e.g., electrical, optical, acoustical or other form of propagated signals such as carrier waves, infrared signals, digital signals).

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for configuring a bus device, the method comprising:
    receiving, by a bus device to which an authorized host device is connected, a first message from the authorized host device, wherein the first message includes a request for a first configuration of the bus device and available configurations of the bus device;
    in response to the received first message, detecting the first configuration of the bus device and the available configurations of the bus device, wherein the first configuration is a current configuration into which the bus device is configured upon being initially connected to the authorized host device;
    receiving by the bus device a second message from the authorized host device, wherein the second message includes an instruction to reconfigure the bus device from the first configuration into a second configuration of the bus device, wherein the second configuration is unavailable to unauthorized host devices;
    in response to the received second message, signaling reconfiguration of the bus device into the second configuration; and
    in response to the signaling, reconfiguring the bus device into the second configuration.

2. The method of claim 1, further comprising:
    when configured into the second configuration, transferring by the bus device isochronous audio data directly to the authorized host device, wherein the bus device when configured into the first configuration cannot transfer audio data isochronously.

3. The method of claim 1, wherein signaling the reconfiguration of the bus device into the second configuration is performed using an application programming interface (API) that is only accessible by a program that is launched responsive to a message received from a host device.

4. The method of claim 1, wherein when configured into the second configuration, the bus device is configured as a Universal Serial Bus (USB) audio 2.0 compliant device.

5. The method of claim 1, further comprising determining by the bus device that a host device is the authorized host device, through a successful negotiation between the bus device and the authorized host device.

6. The method of claim 1, further comprising determining by the bus device that a host device is the authorized host device, by recognizing a key transmitted by the authorized host device, wherein the key is included in a look-up table maintained on the bus device.

7. The method of claim 6, wherein the key represents a version of an operating system running on the authorized host device.

8. The method of claim 1, further comprising upon detecting the first configuration of the bus device and the available configurations of the bus device, causing the bus device to transmit a third message to the authorized host device, wherein the third message includes the first configuration and the available configurations.

9. A bus device comprising:
    a processor; and
    a memory coupled to the processor to store instructions which when executed by the processor cause the processor to
        receive a first message from an authorized host device, wherein the first message includes a request for a first configuration of the bus device and available configurations of the bus device,
        in response to the first message, detect the first configuration of the bus device and the available configurations of the bus device, wherein the first configuration is a configuration into which the bus device is configured upon being initially connected to an authorized host device,
        receive a second message from the authorized host device, wherein the second message includes an instruction to reconfigure the bus device from the first configuration into a second configuration, wherein the second configuration is unavailable to unauthorized host devices,
        in response to the second message, signal a reconfiguration of the bus device into the second configuration, and
        in response to the signal reconfigure the bus device into the second configuration.

10. The bus device of claim 9, wherein when configured into the second configuration, the processor of the bus device signals that isochronous audio data be transferred to the authorized host device, wherein the bus device when configured into the first configuration cannot transfer audio data isochronously.

11. The bus device of claim 9, wherein signaling the reconfiguration of the bus device into the second configuration is performed using an application programming interface (API) that is only accessible by a program that is launched responsive to a message received from a host device.

12. The bus device of claim 9, wherein when configured into the second configuration, the bus device is configured as a Universal Serial Bus (USB) audio 2.0 compliant device.

13. The bus device of claim 9, wherein the processor is to determine that a host device is the authorized host device by performing a successful negotiation between the bus device and the authorized host device.

14. The bus device of claim 9, wherein the processor is to determine that a host device is the authorized host device by recognizing a key transmitted by the authorized host device, wherein the key is included in a look-up table maintained on the bus device.

15. The bus device of claim 14, wherein the key represents a version of an operating system running on the authorized host device.

16. The bus device of claim 9, wherein upon detecting the first configuration of the bus device and the available configurations of the bus device, the processor signals that a third message be transmitted to the authorized host device, wherein the third message includes the first configuration and the available configurations.

17. An article of manufacture comprising:
a non-transitory machine-readable medium of a bus device in which are stored instructions which a processor in the bus device executes to
receive a first message from an authorized host device, wherein the first message includes a request for a first configuration of the bus device and available configurations of the bus device,
in response to the first message, detect the first configuration of the bus device and the available configurations of the bus device, wherein the first configuration is a configuration into which the bus device is configured upon being initially connected to the authorized host device,
receive a second message from the authorized host device, wherein the second message includes an instruction to reconfigure the bus device from the first configuration into a second configuration of the bus device, wherein the second configuration is unavailable to unauthorized host devices,
in response to the second message, signal a reconfiguration of the bus device into the second configuration.

18. The article of manufacture of claim 17, wherein the stored instructions when executed by the processor cause the bus device, when configured into the second configuration, to transfer isochronous audio data to the authorized host device, wherein the bus device when configured into the first configuration cannot transfer audio data isochronously.

19. The article of manufacture of claim 17, wherein to signal the reconfiguration of the bus device into the second configuration, the stored instructions when executed by the processor use an application programming interface (API) that is only accessible by a program that is launched responsive to a message received from a host device.

20. The article of manufacture of claim 17, wherein when configured into the second configuration, the bus device is configured as a Universal Serial Bus (USB) audio 2.0 compliant device.

* * * * *